J. J. GAGE.
ATTACHMENT FOR CULTIVATORS.
APPLICATION FILED JUNE 19, 1913.
1,086,449.
Patented Feb. 10, 1914.
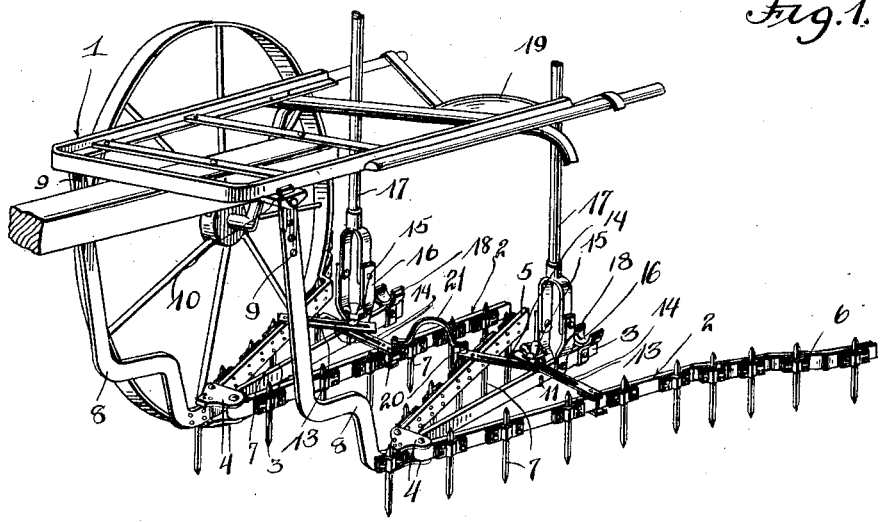
Fig. 1.
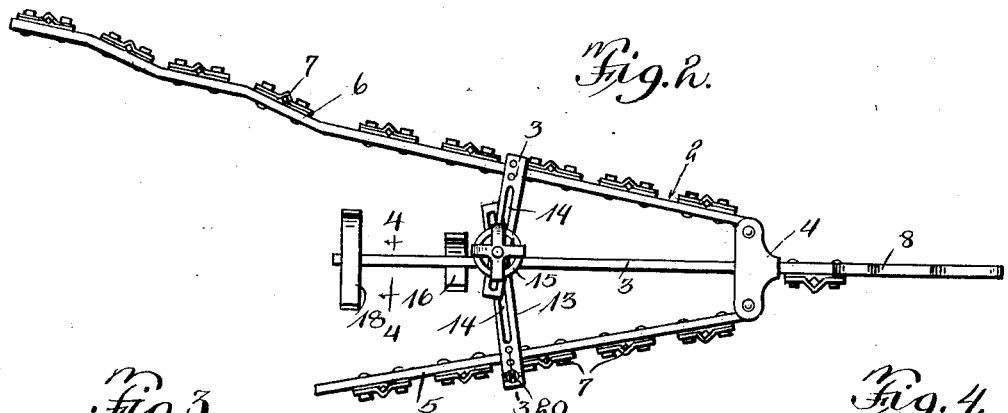
Fig. 2.
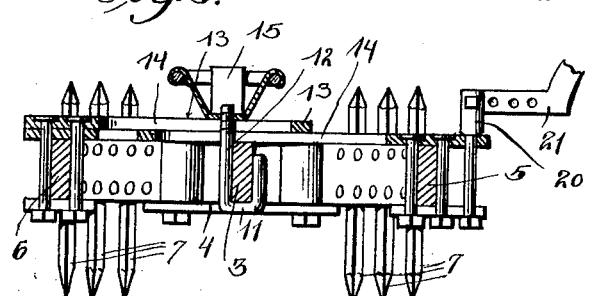
Fig. 3.
Fig. 4.
Witnesses
Inventor
J. J. Gage
By Chandlee & Chandlee
Attorney

UNITED STATES PATENT OFFICE.

JAMES J. GAGE, OF LLANO, TEXAS.

ATTACHMENT FOR CULTIVATORS.

1,086,449.  Specification of Letters Patent.  Patented Feb. 10, 1914.

Application filed June 19, 1913. Serial No. 774,645.

*To all whom it may concern:*

Be it known that I, JAMES J. GAGE, a citizen of the United States, residing at Llano, in the county of Llano, State of Texas, have invented certain new and useful Improvements in Attachments for Cultivators; and I do hereby declare the following to be a full, clear, and exact description of the invention, such as will enable others skilled in the art to which it appertains to make and use the same.

The present invention is directed to attachments for cultivators.

The invention has for its object to provide an attachment so constructed that it can be easily and quickly attached to or removed from a cultivator of conventional form.

A further object of the invention is to provide an attachment in the nature of a harrow which can be quickly applied to the cultivator frame upon the removal of the cultivators.

With these and other objects in view, this invention resides in the novel features of construction, formation, combination and arrangement of parts to be hereinafter more fully described, claimed and illustrated in the accompanying drawing, in which:—

Figure 1 is a perspective view of a cultivator frame, showing the attachment applied thereto. Fig. 2 is a top plan view of one of the harrows removed. Fig. 3 is a sectional view on line 3—3 of Fig. 2. Fig. 4 is a rear elevation of the cultivator frame showing the harrows attached thereto.

Referring to the drawing, the numeral 1 designates the frame of a conventional type of cultivator and in connection therewith the harrow attachment is used.

A pair of harrows 2 are employed and consist of beams 3, upon the forward ends of which are connected clips 4. Pivotally connected to the clips and upon opposite sides of the beams 3 are bars 5 and 6, the bars 6 being of greater length than the bars 5 so that greater harrowing area is obtained. The bars 5 and 6 are provided with adjustably mounted teeth 7, of any conventional form. The forward ends of the beams 3 terminate in upwardly directed arms 8, which have their upper ends provided with a plurality of perforations 9, so that the same can be adjustably connected to the bearings 10, which also serve to support the beams of the cultivators when the same are in use upon the frame.

To the beams 3 are connected the hooked ends 11 of the bolts 12, said bolts being engaged in the slots formed in the arms 13, the inner ends of which are arranged in overlapping relation. The slots are indicated by the numerals 14.

Engaged upon the upper ends of the bolts 12 are hand nuts 15, the same being operable to hold the arms 13 in adjusted positions, whereby the bars 5 and 6 can be adjusted and retained in their proper converging relations.

Mounted on the beams 3 are brackets 16 which are engaged by the usual hangers 17. The beams are also provided at their rear ends with stirrups 18, which can be conveniently engaged by the feet of the driver occupying the seat 19, which is supported by the frame 1. The beams 5 are further provided with clips 20 which are adjustably engaged by the opposite ends of the yoke 21, said yoke serving to hold the harrows properly positioned.

From the foregoing description it will be seen that a harrow attachment has been provided which can be easily applied to a cultivator frame upon removal of the usual cultivators.

What is claimed is:—

In a cultivator, the combination with a frame, of hangers carried by the frame, harrows comprising beams, clips carried by the forward ends of the beams, bars pivotally connected at their forward ends to the clips, teeth adjustably connected to said bars, said beams having their forward ends terminating in upwardly extending arms, means for adjustably connecting the arms to the frame, slotted arms having their outer ends connected to the bars and their inner ends arranged in over-lapping relation, bolts carried by the beams for engaging the slotted arms, hand nuts engaged upon the bolts for holding the slotted arms in adjusted positions and thus the bars in adjusted converging relations, brackets carried by the beams and pivotally connected to the hangers.

In testimony whereof, I affix my signature, in the presence of two witnesses.

JAMES J. GAGE.

Witnesses:
C. BREAZEALE,
JOHN W. SIMPSON.

Copies of this patent may be obtained for five cents each, by addressing the "Commissioner of Patents, Washington, D. C."